March 18, 1924. 1,486,988
E. C. POOL
WEIGHING SCALE
Filed June 12, 1919 4 Sheets-Sheet 1

Witnesses.
C. E. Wilcox
Frances Doyle

Inventor
Elmer C. Pool
By George R. Frye
Attorney

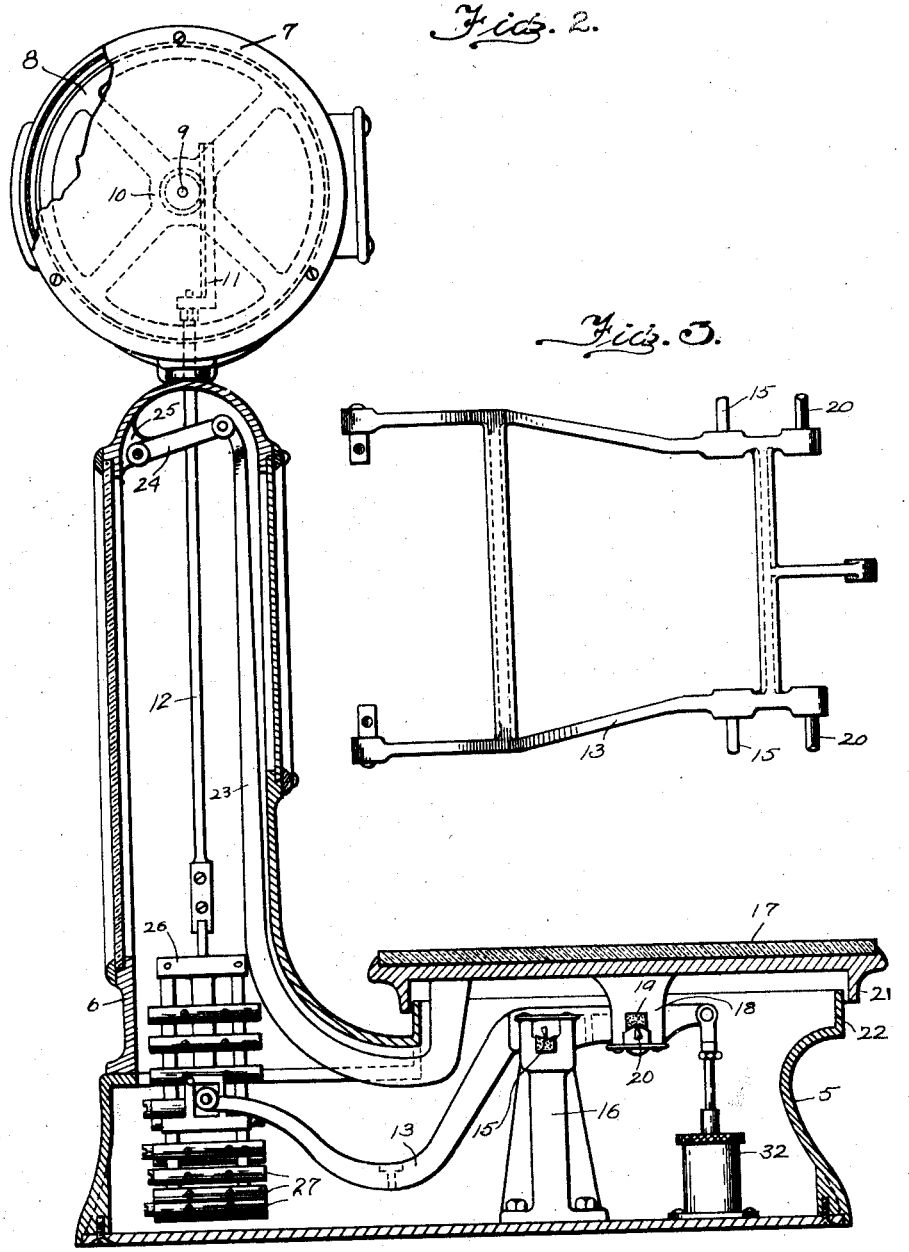

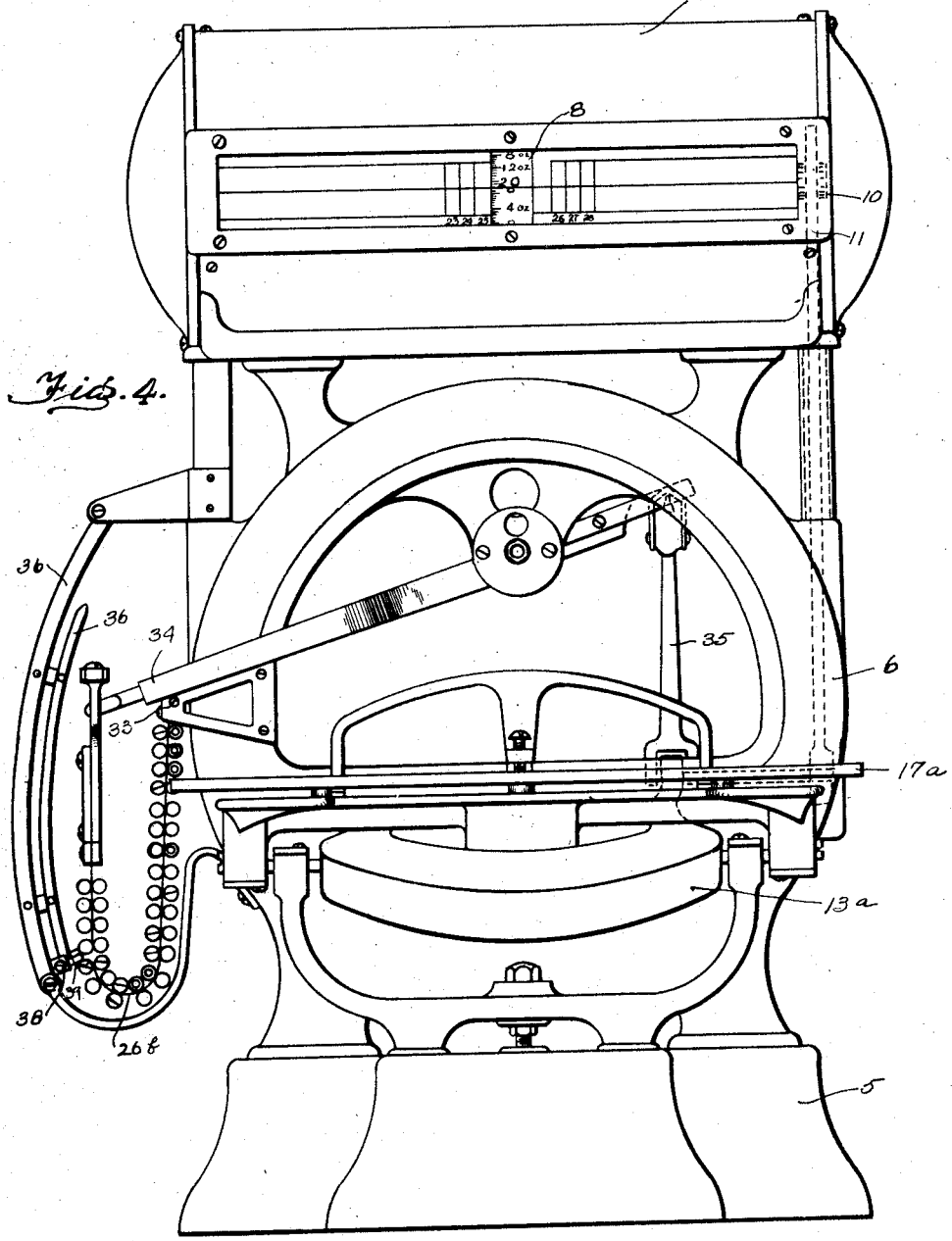

March 18, 1924.
E. C. POOL
WEIGHING SCALE
Filed June 12, 1919      4 Sheets-Sheet 4
1,486,988
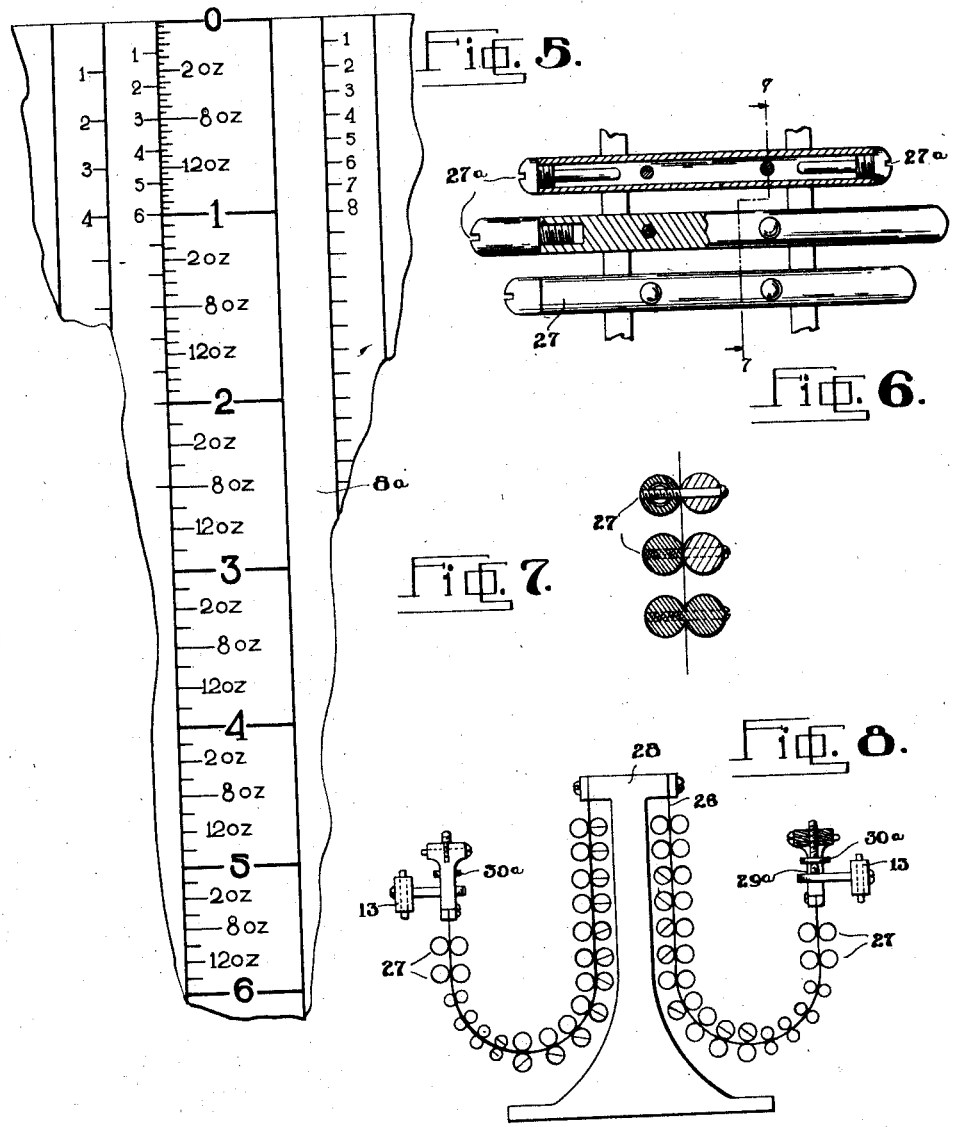
Inventor
Elmer C. Pool
By George R. Frye
Attorney Patented Mar. 18, 1924.

1,486,988

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

WEIGHING SCALE.

Application filed June 12, 1919. Serial No. 303,726.

*To all whom it may concern:*

Be it known that I, ELMER C. POOL, a citizen of the United States, residing at New Castle, in the county of Lawrence and State of Pennsylvania, have invented certain new and useful Improvements in Weighing Scales, of which the following is a specification.

This invention relates to improvements in weighing scales, and more particularly to automatic weighing scales utilizing the force of gravity in their load-offsetting operations, but without employing a pendulum or pendulums as their load-offsetting elements.

Among the principal objects of this invention are the improvement of automatic gravity weighing scales; the elimination of pendulums in scales of this type; the provision of a simple, efficient and inexpensive counterbalancing element adapted to be readily moved to a position offsetting the weight of a load placed upon the scale platform; the adaptation of this novel counterbalancing element to scales having a low platform and a substantially dust-proof casing; and the provision of a scale mechanism having a plurality of readily adjustable elements whereby the scale may be quickly sealed to any desired chart, whether the graduations on the chart be uniformly spaced or a greater space is allotted to the graduations depicting certain weights.

Other objects and advantages will readily appear from the following description, in which reference is had to the accompanying drawings illustrating preferred embodiments of my invention by way of exemplification, and wherein similar reference numerals designate similar parts throughout the several views.

In the drawings:—

Figure 2 is a side elevation thereof, with parts in section;

Figure 3 is a plan view of the scale beam employed therein;

Figure 4 is a front elevation of a scale employing another embodiment of my invention;

Figure 5 is a detail view showing a portion of a chart that may be employed with scales embodying my invention and having some of the weight graduations thereon spaced a certain distance apart, other graduations spaced other distances, and so on;

Figure 6 is a detail elevation, with parts in longitudinal section, of a portion of the counterbalancing element employed;

Figure 7 is a transverse detail section taken substantially on the line 7—7 of Figure 6; and Figure 8 is an end elevation of the load-offsetting element that may be employed with a chart such as is shown in Figure 5.

Figure 1:
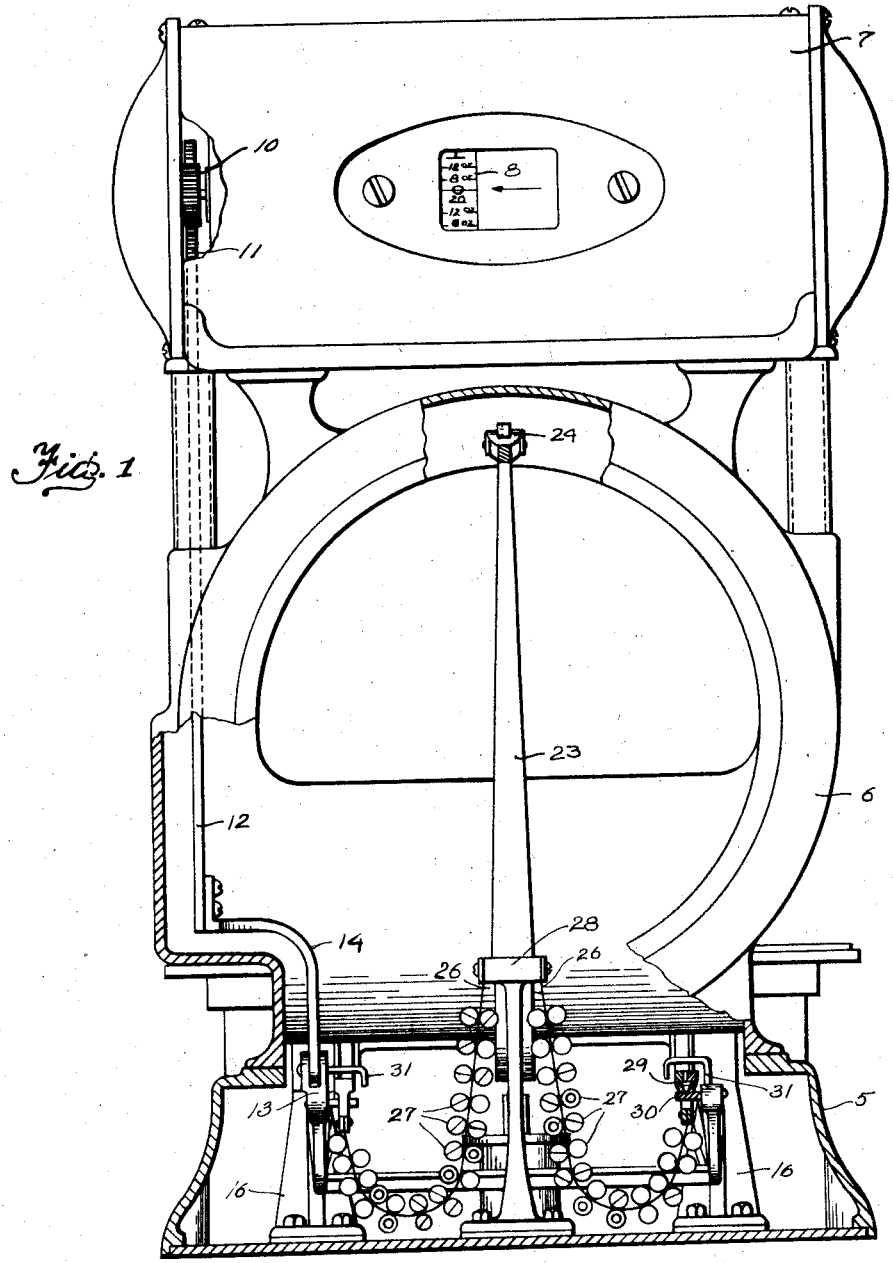
Figure 1 is a rear elevation of a scale embodying my invention, with parts broken away to show the interior mechanism.

Referring first to the embodiment shown in Figures 1 and 2, the base 5 carries adjacent its rear end a casing 6 supporting at its upper extremity a housing 7 adapted to contain the cylindrical chart 8 bearing suitable weight graduations thereon. The housing, casing and base are preferably so constructed and united that the weighing mechanism of the scale will be enclosed so as to be substantially free from dust, dirt and like particles of matter that might influence the weighing operations. The chart 8 is fixed upon a shaft 9 pivotally mounted within the housing 7 and carrying a pinion 10 adapted to mesh with a rack 11 secured to the upper end of the rack bar 12, the lower end of said rack bar being suitably connected with the scale beam 13, as by means of the link 14 shown in Figure 1.

The scale beam 13 is preferably a lever of the first order formed substantially as shown in Figure 3, and is fulcrumed, as at 15, upon bearings carried by upstanding brackets 16 suitably mounted upon the base of the scale. The platform 17 is preferably provided with a pair of spaced downwardly-extending legs 18 carrying bearings 19 adapted to rest upon the pivots 20 of the scale beam (see Figure 2), and to aid in the elimination of dust, etc., from the interior of the casing, the platform is preferably formed with a depending flange or apron 21 adapted to overlap a similarly shaped but slightly smaller flange 22 carried by the scale base. Suitable means may be employed to maintain the platform in a level position regardless of where a load is placed thereon. In the illustrated embodiment, a check-rod 23 is suitably secured at one end to the base of the platform and extends upwardly within the housing 6, being pivotally secured at its upper end to a check-link 24, the opposite end of which is pivoted in the bracket 25 formed in the casing.

The load-offsetting or counterbalancing element utilized in this embodiment of my invention comprises a pair of oppositely-disposed flexible members 26 having secured thereto at spaced intervals a plurality of weights 27, substantially as shown in Figure 1, one end of each flexible member being fastened to a central upstanding bracket 28 supported upon the scale base, and the other end of each flexible member carrying a pivot 29 adapted to rest upon bearings 30 secured in the scale beam 13. Suitable means, as, for example, the brackets 31, may be mounted upon the scale beam to prevent accidental displacement of the pivots 29. Also the arrangement may be such that the scale beam 13 carries the pivot, as 29ª, fitting into an adjustable bearing 30ª carried by one end of each of the flexible members 26, as shown in Figure 8.

In the assembling of the scale, the flexible members 26 are provided with the spaced weights 27, and their inner ends are secured to the post 28, the flexible elements being then looped away from each other substantially as shown in Figure 1, and their outer ends pivotally secured to the scale beam 13. Thus, the majority of the weights 27 normally depend from and are supported by the post 28, only those weights nearest the scale beam exerting a downward pull upon the inner end of the scale beam. These weights 27 of each flexible element nearest the scale beam 13 are preferably utilized to assist in floating the platform 17 and the platform lever mechanism, the remaining weight 27 being employed to offset the weights of loads placed upon the scale platform. In operation, a load placed upon the scale platform depresses the outer end of the scale beam 13 and raises the inner end thereof which is secured to the flexible members 26, the inner end of the scale beam continuing to rise until a sufficient number of weights 27 have been lifted from their normal position by the scale beam to offset the weight of the load on the platform. If an additional load is placed on the platform, the scale beam will again rise and take up a new position offsetting the new weight. When the load is removed, the weights 27 and the scale beam fall by gravity to their original positions. Suitable means are preferably employed to cushion the movements of the scale beam and platform, as, for example, the dash pot 32 connected to the scale beam 13, substantially as shown in Figure 2.

Each of the weights 27 is preferably formed with a cylindrical body portion having secured in the ends thereof detachable members 27ª, said end members being secured in any desired manner, as, for example, by screw threads. If desired, the cylindrical body portion may be hollowed throughout, as shown in the uppermost of the weights illustrated in Figure 6 of the drawings, or the cylindrical body portion may be of solid formation having recesses or threaded apertures in its ends to receive the end members 27ª. The end members 27ª may be of different weights as desired so that an end member of the necessary weight may be readily inserted into each of the cylindrical weight members 27, the necessary weight being readily found by experimentation or by application of mathematical formulas. If in sealing the scale it is found that any member 27 is too heavy or too light, adjustment can be quickly made by removing one or both of the end weights and inserting a weight or weights of a different capacity.

The provision of this universal interchange and adjustability of end elements 27ª in the weights 27 enables the use of a chart having different spaces thereon allotted for the representation of the fractional parts of different weights and the value computations of the weights at various prices per pound. Thus, in Figure 5 is shown a chart 8ª having comparatively large spacings for the ounce and fractional ounce markings of the first 2 lbs., lesser spacings for the fractional markings of the 3rd pound, slightly lesser spacings for the fractional markings of the 4th pound, and even lesser spacings for the markings of the remaining pounds. Such a chart gives a wide, clear interval between the markings of the first few pounds of the scale's capacity, which wide spacings could not practically be extended around the entire chart without making a chart of such great diameter that it would be cumbersome and easily distorted under the usual weather conditions. It has been found by investigation that a very large proportion of the weighings made in the ordinary daily transactions of retail stores is in weights less than 2 lbs., and that practically 90% of the transactions are made in weights less than 5 lbs. Therefore, a chart such as shown in Figure 5 would be particularly adapted for use in retail stores, such as grocery stores and butcher shops, providing clear, wide graduations for the fractional parts of the first few pounds in which the large majority of transactions are effected, while providing graduations not so widely spaced throughout the remainder of the capacity of the chart, in which weights a comparatively small percentage of transactions is effected.

When a chart such as is shown in Figure 5 is used in a scale embodying my invention, I preferably construct the counterbalancing element substantially as shown in Figure 8, wherein the weights 27 nearest the scale beam which are utilized for assisting in floating the platform and levers of the scale remain substantially as in scales utilizing charts with even graduations, the next few weights 27 being of smaller capacity so that in the weighing operation a comparatively great length of travel of the scale beam must be had to offset a load within the weighing capacity of these lighter weights—i. e., the first few pounds of the scale's capacity—the remaining weights 27 being of greater capacity so that the length of travel of the scale beam in offsetting loads exceeding those of the first few pounds will be comparatively less.

The disposition and arrangement of the flexible elements 26 on opposite sides of the central post 28 provide for automatic means for correcting for any slight changes of the base of the scale from its normal level position. It is one characteristic of automatic gravity scales that to insure correct weighings throughout the capacity of the chart, the scale must be kept level. In this embodiment of my invention, however, if one portion of the base is elevated above the rest, one of the flexible elements 26 will be elevated and the other flexible element 26 depressed in proportion to the changed position of the center of gravity of the scale. Thus, one of the flexible elements will be taken up, and the other one will recede in proportion to the changes out of level of the scale base.

In Figure 4 is shown an embodiment of my invention utilizing a single flexible element 26$^b$, one end of which is secured to the bracket 33 fixed upon the casing 6 of the scale, and the other end of the flexible element being pivotally connected with a transverse lever 34 fulcrumed within the casing 6 and connected, as by the link 35, with the scale beam 13$^a$ supporting the platform 17$^a$. To avoid excessive swinging movement of the flexible element 26$^b$ I provide a pair of spaced segmental guides 36 between which the adjustable stud 38 carried by a bracket 39 secured to the flexible element 26$^b$ is adapted to travel during the operation of the scale.

From the above it will be apparent that the illustrated embodiments of my invention provide means well calculated to adequately fulfill the objects primarily stated. The construction is, however, susceptible to modification, variation, and change without departing from the spirit and scope of the invention as set forth in the subjoined claims.

Having described my invention, I claim:

1. In a scale, and in combination with the scale beam thereof, load-offsetting means comprising a flexible element having a plurality of spaced weights thereon, some of said weights comprising a body portion and an auxiliary end piece detachably secured thereto.

2. In a scale, and in combination with the scale beam thereof, load-offsetting means comprising a flexible element having a plurality of spaced weights thereon, some of said weights comprising a body portion having end apertures therein and auxiliary weights adapted to be secured therein.

3. In a scale, and in combination with the scale beam thereof, load-offsetting means comprising a flexible element having a plurality of spaced weights thereon, some of said weights comprising a cylindrical body portion and an auxiliary end piece detachably secured thereto.

4. In a scale, and in combination with the scale beam thereof, load-offsetting means comprising a flexible element having a plurality of spaced weights thereon, some of said weights comprising a cylindrical body portion having end apertures therein and auxiliary end pieces adapted to be secured in said apertures.

5. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, each of said weights comprising a body portion and an auxiliary weight detachably secured thereto.

6. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, each of said weights comprising a body portion and an auxiliary end piece detachably secured thereto.

7. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, each of said weights comprising a body portion having end apertures therein and auxiliary weights adapted to be secured therein.

8. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, each of said weights comprising a cylindrical body portion and an auxiliary end piece detachably secured thereto.

9. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, each of said weights comprising a cylindrical body portion having end apertures therein and auxiliary end pieces adapted to be secured in said apertures.

10. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, indicating means actuated from the scale beam, and a casing adapted to enclose the scale beam, load-offsetting means and indicating means.

11. In a scale, and in combination with the scale beam thereof, load-offsetting means comprising a pair of oppositely-disposed flexible members having a plurality of spaced weights thereon, means for fixedly securing one end of each of the flexible members, means for pivotally securing the other end of each flexible member to the scale beam, indicating means actuated from the scale beam, a platform mounted upon the scale beam, and a casing adapted to enclose the scale beam, load-offsetting means and indicating means, including an upstanding portion on the casing and a downwardly extending portion on the platform adapted to overlap in the operation of the scale.

12. In a scale, a cylindrical indicating chart having weight graduations arranged around its periphery, the graduations adjacent the beginning of the chart being equally spaced a predetermined distance from each other, and the remaining graduations being spaced lesser distances from each other and weighing mechanism connected to said chart, said weighing mechanism being adapted to move said chart through relatively great distances to indicate variations in light loads and through relatively small distances to indicate similar variations in heavy loads.

13. In a scale, a cylindrical indicating chart having weight graduations arranged around its periphery, that chart portion adjacent the beginning of the chart bearing weight graduations equally spaced from each other a predetermined distance, the next adjacent portion of the chart bearing graduations equally spaced a lesser distance from each other, and the remaining portion of the chart bearing graduations spaced even lesser distances from each other and weighing mechanism connected to said chart, said weighing mechanism being adapted to move said chart through relatively great distances to indicate variations in loads of light weight, to move said chart greater distances to indicate similar variations of intermediate weight, and to move said chart through relatively great distances to indicate similar variations in relatively heavy loads.

14. In a scale, a platform, load-offsetting means connected with the platform and comprising flexible members having a plurality of spaced weights thereon of unequal offsetting capacity, the lightest of said weights being positioned adjacent the beginning of said flexible member, indicating means arranged to be actuated from the platform and comprising a chart having weight graduations thereon separated from each other by unequal distances, the widest spacings between the graduations being adjacent the beginning of the chart.

15. In a scale, a platform, load-offsetting means connected with the platform and comprising flexible members having a plurality of spaced weigths of varying capacities thereon, indicating means arranged to be actuated from the platform and comprising a chart having weight indications thereon separated from each other by unequal distances, the lighter of the flexible weights being arranged to correspond with the widest spacings on the chart.

16. In a scale, a platform, load-offsetting means connected thereto and comprising flexible members carrying a series of weights of varying capacities, and a cylindrical indicating chart arranged to be rotated upon movement of the platform and having weight and value graduations thereon separated from each other by unequal distances, the lighter of the flexible weights being arranged to correspond with the wider spacings on the chart.

ELMER C. POOL.

Witnesses:
L. C. MANTZ,
R. B. MORROW.